United States Patent
Farina

[19]

[11] Patent Number: 5,915,506
[45] Date of Patent: Jun. 29, 1999

[54] EMERGENCY STOP MODULE FOR A ROBOT

[75] Inventor: Daniel Y. Farina, Bourg la Reine, France

[73] Assignee: Comptoir Commercial de Mecanique et d'Outillage de Precision CCMOP, France

[21] Appl. No.: 08/758,945

[22] Filed: Dec. 3, 1996

[30] Foreign Application Priority Data

Dec. 6, 1995 [FR] France .................................. 95 14415

[51] Int. Cl.⁶ ............................. B60T 11/10; B25J 19/00
[52] U.S. Cl. ........................................ 188/151 R; 901/49
[58] Field of Search .......................... 188/151 R; 901/49, 901/27–29; 403/31; 192/150, 56.1

[56] References Cited

U.S. PATENT DOCUMENTS

| | | | |
|---|---|---|---|
| 4,741,642 | 5/1988 | Carlton | 403/59 |
| 5,086,901 | 2/1992 | Petronis et al. | 192/150 |
| 5,142,212 | 8/1992 | Pidcoe | 318/568.11 |
| 5,293,809 | 3/1994 | Van Der Heijden et al. | 901/29 |

*Primary Examiner*—Peter M. Poon
*Attorney, Agent, or Firm*—Anthony J. Casella; Gerald E. Hespos; Ludomir A. Budzyn

[57] ABSTRACT

An emergency stop module for a robot or the like, of the type comprising a body (1) forming a compression chamber (3) and fed with air under pressure, provided with an opening (5) which is normally closed by an inner plate (6) firmly attached to an outer flange (7), the body (1) and the outer flange (7) being firmly attached to two elements respectively of the robot, characterized by the fact that it is provided with an automatic resetting device formed of a piston-cylinder unit (14–16) arranged in the flange (7) and the rod (17) of which passes through the inner plate (6) to rest against the bottom (2) of the body (1).

2 Claims, 2 Drawing Sheets

EMERGENCY STOP MODULE FOR A ROBOT

BACKGROUND OF THE INVENTION

1. Field of the Invention

The present invention relates to an emergency stop module for a robot or the like, of the type comprising a body forming a compression chamber, fed with air under pressure, provided with an opening which is normally closed and by an inner plate which is firmly attached to an outer flange, the body and the outer flange being firmly attached to two elements of the robot respectively.

2. Description of the Prior Art

When the above-described prior art robot is subjected to abnormal stresses, both in flexure and in rotation or compression, the inner plate moves away from the opening and allows the air to escape from the compression chamber, while permitting a relative movement of the two parts of the module. The drop in pressure within the chamber is then immediately detected, due to a suitable sensor, which makes it possible to stop the operation of the robot and thus avoid accidents.

Such a safety device is very effective and it is now of general use. However, after its actuation, human intervention is necessary in order to reset the emergency stop module before it is possible to operate the robot again. Likewise, human intervention is necessary after each intentional stop of the robot, for instance at the end of the day, due to the interruption of the feeding of compressed air, which automatically causes the disconnecting of the two parts of the module.

SUMMARY OF THE INVENTION

The main object of the present invention is to overcome the above-described drawbacks of the prior art and, in order to do this, its object is an emergency stop module of the type mentioned above which is characterized essentially by the fact that it is provided with an automatic resetting device formed of a piston-cylinder unit arranged in the flange and the rod of which passes through the inner plate to rest against the bottom of the body.

Thus, when the module is triggered as a result of an abnormal stress, it can, in most cases, automatically be replaced in position or reset, due to the action of the piston-cylinder unit.

The piston-cylinder unit is preferably continuously fed with fluid under pressure, so that its rod rests continuously against the bottom of the body with a given force.

Thus, the module can be reset automatically as soon as the abnormal stress ceases.

BRIEF DESCRIPTION OF THE DRAWINGS

One embodiment of the invention is described below by way of example with reference to the accompanying drawings, in which.

DETAILED DESCRIPTION OF THE PREFERRED EMBODIMENT

Figures 1, 2:
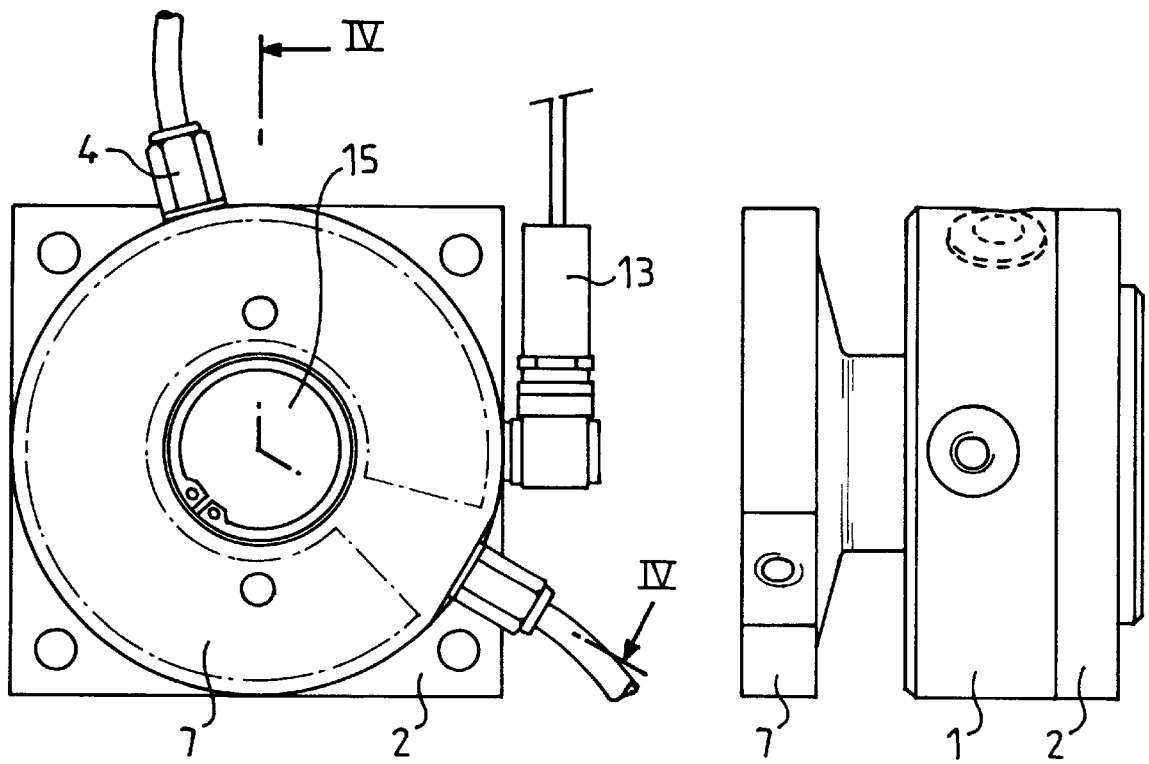
FIG. 1 is a top view of an emergency stop module in accordance with the invention.
FIG. 2 is a side view of this module.

The module shown in the accompanying figures comprises, first of all, a hollow body 1 of cylindrical shape provided with a bottom plate 2 of square base. The body 1 thus constitutes a compression chamber 3 fed with compressed air by a nozzle 4.

On the side opposite the bottom plate 2, the body 1 is provided with a central opening 5 which is normally closed by an inner plate 6 which is firmly attached to a cylindrical outer flange 7 by screws such as 8.

The body 1 and the flange 7 are firmly attached to two elements respectively of a robot or the like, not shown. The cylindrical flange 7 will, for instance, be fastened to the clamp of the robot while the square base of the bottom plate 2 will be fastened to the arm of the robot.

The body 1 is furthermore provided with two spherical pins 9 protruding to the inside of the compression chamber 3 and which normally are contained within the corresponding recesses 10 provided on the inner plate 6.

Figure 5:
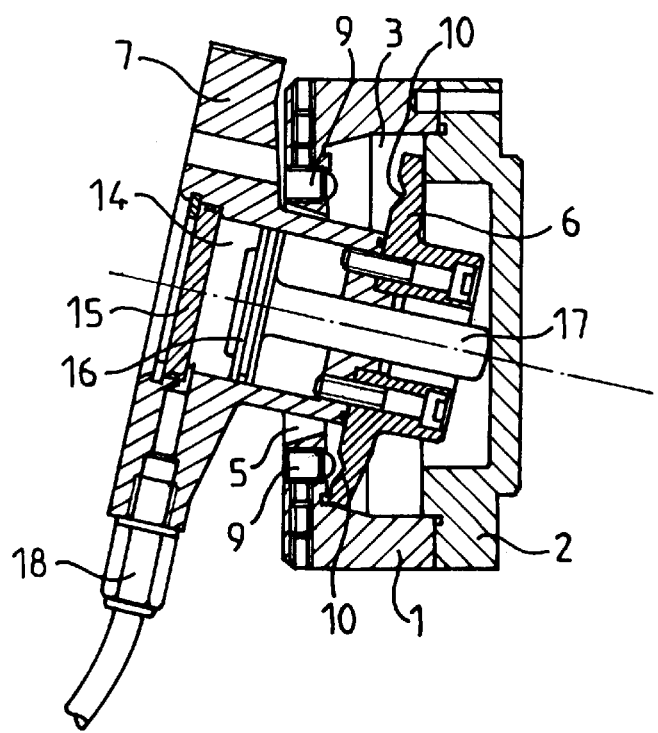
FIG. 5 is a sectional view similar to FIG. 4, showing the module in the position of triggering the emergency stop.

Thus, when the clamp of the robot is subjected to an abnormal stress in flexion or compression, the inner plate 6 moves away from the opening 5, as shown in FIG. 5, so that the air can then escape from the compression chamber 3 through said opening.

Figure 3:
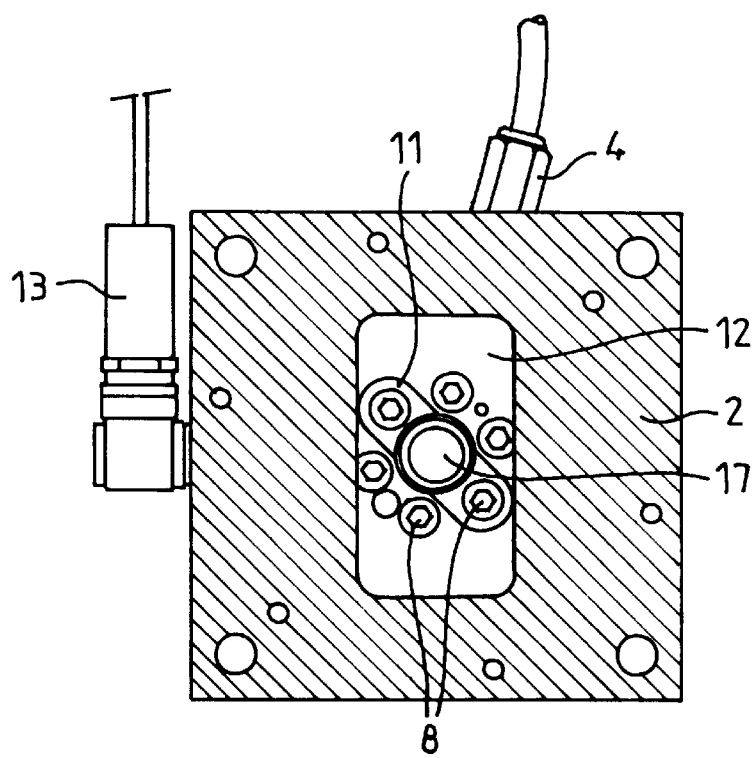
FIG. 3 is a sectional view along the line III—III of FIG. 4.

Likewise, if the clamp of the robot is subjected to an abnormal stress in rotation, the inner plate 6 also moves away from the opening 5 due to the action of the spherical pins 9 emerging from their respective recesses 10. It will be noted in this connection that the movement of rotation of the inner plate 6 is in fact limited to about 30° by a protruding part 11 which abuts within a recess 12 of rectangular shape provided in the bottom plate 2, as illustrated in FIG. 3.

The subsequent drop in pressure within the compression chamber 3 is then immediately detected by a suitable sensor 13 which causes the stopping of the robot and thus makes it possible to avoid accidents. However, before being able to place the robot back in operation, human intervention is generally necessary on the emergency stop module in order again to close the opening 5 by means of the interior plate 6.

Figure 4:
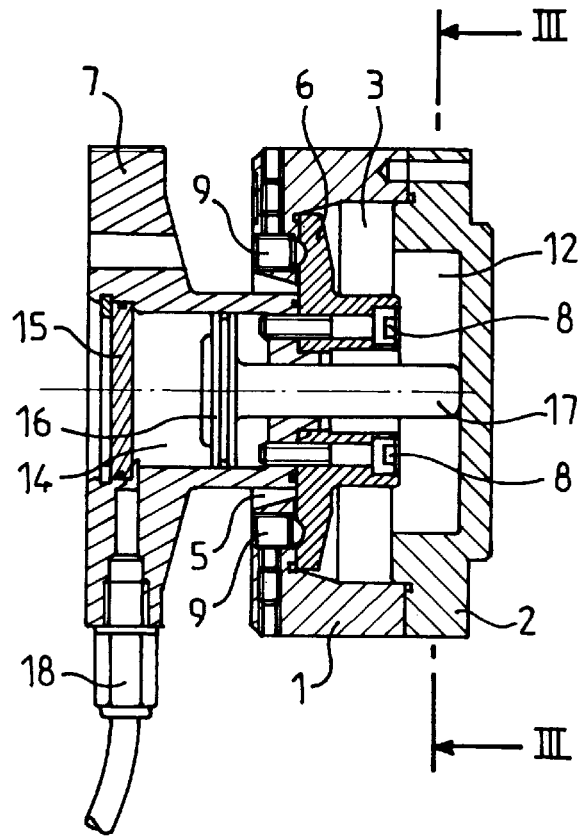
FIG. 4 is a sectional view along the line IV—IV of FIG. 1.

In order to overcome this drawback, in accordance with the present invention the module is equipped with an automatic resetting device formed essentially of a piston-cylinder unit incorporated in the flange 7. This unit comprises a cylindrical chamber 14 arranged in the flange and closed at its upper part by a plug 15, within which cylinder there is mounted a piston 16 the rod 17 of which passes tightly through the inner plate 6 to rest against the bottom plate 2. The upper part of the cylindrical chamber 14 is preferably constantly fed with compressed air by a nozzle 18 so that the rod 17 of the piston 16 rests permanently against the bottom plate 2 with a given force, as shown in FIG. 4. The triggering threshold of the module is then a function of the pressure differential present between the chamber 14 fed by the nozzle 18 and the chamber 3 fed by the nozzle 4.

Thus, when the emergency stop module is triggered as a result of an abnormal stress, as shown, for instance, in FIG. 5, it can in most cases reset itself automatically, that is to say without human intervention, as soon as the abnormal stress ceases, under the action of the rod 17 along which, by resting against the bottom plate 2, returns the inner plate 6 into the position closing the opening 5 so as to re-establish the tightness at this level. In order for this to be possible, it is necessary, of course, that the movement of relative rotation of the two parts of the module not be too great, in order that the spherical pins 9 can place themselves properly back in the recesses 10 of the plate. However, in the event that a manual intervention is necessary, the resetting of the module is facilitated by the action of the rod 17, so that the use of such a module makes a considerable saving in time possible.

What is claimed is:

1. An emergency stop module for a robot, of the type comprising a body having a body and forming a compression chamber fed with air under pressure, the body being provided with an opening which is normally closed by an inner plate which is firmly attached to an outer flange, the body and the outer flange being firmly attached respectively to two elements of the robot, characterized by the fact that the emergency stop module is provided with an automatic resetting device formed of a piston-cylinder unit provided in the flange, the piston-cylinder unit comprising a rod which passes through the inner plate to rest against the bottom of the body.

2. An emergency stop module according to claim 1, characterized by the fact that the cylinder-piston unit is constantly fed with fluid under pressure so that its rod rests continuously against the bottom of the body with a given force.

* * * * *